UNITED STATES PATENT OFFICE.

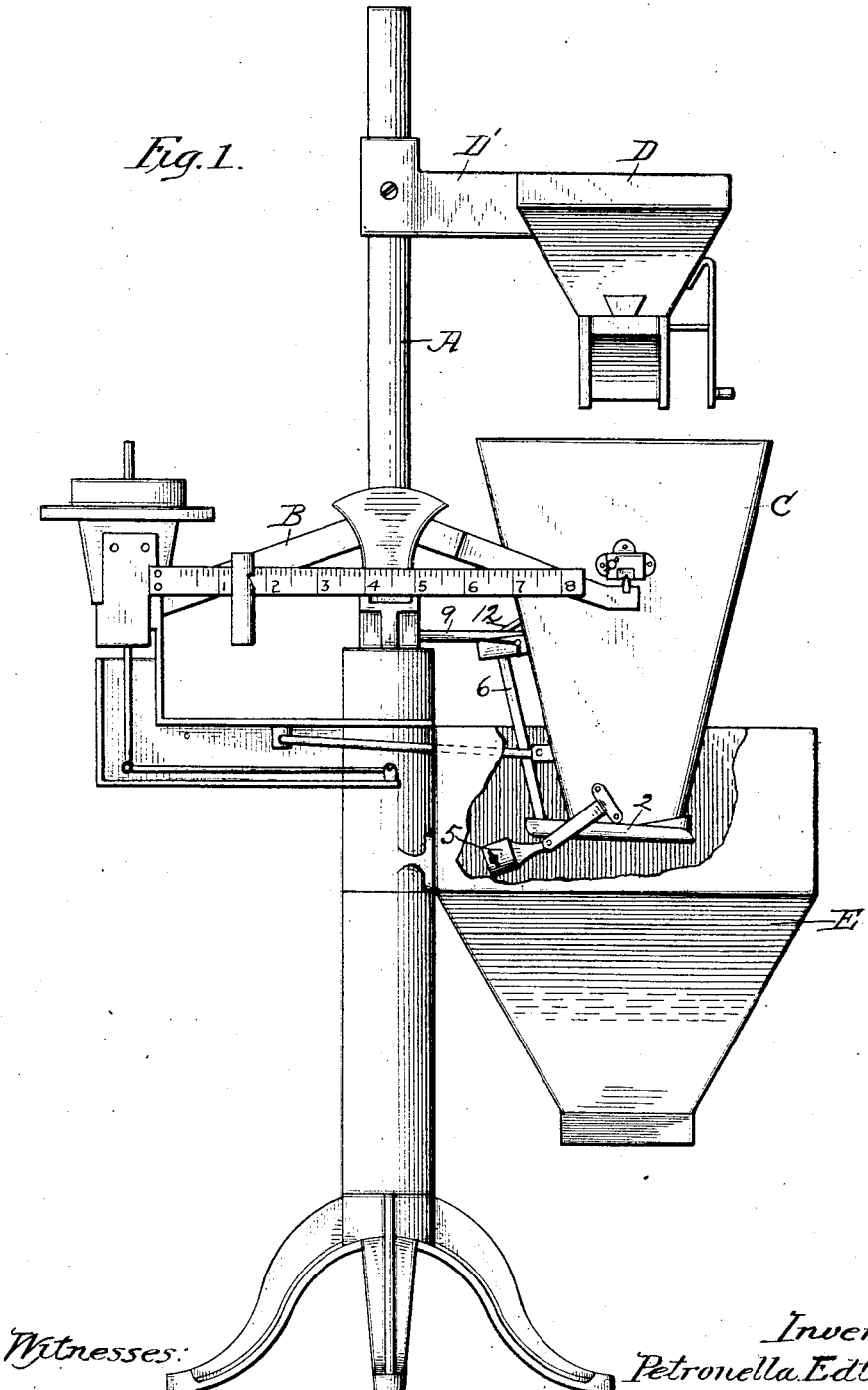

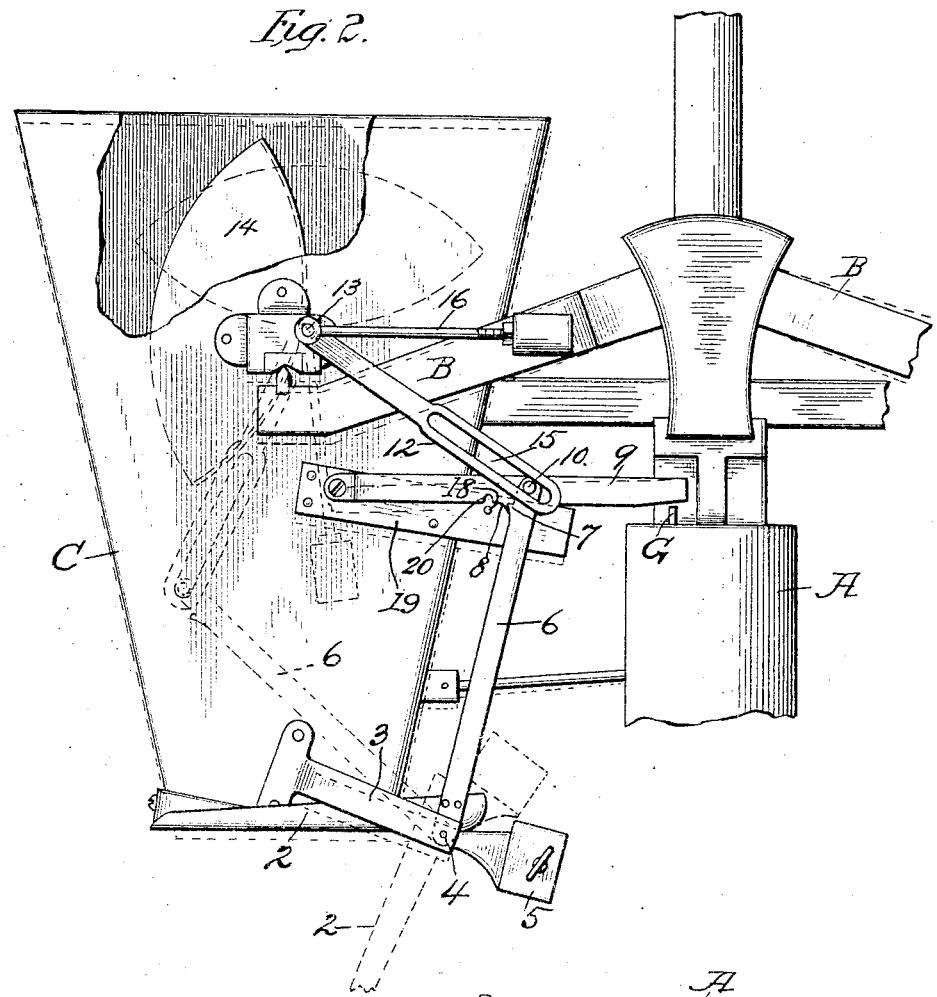
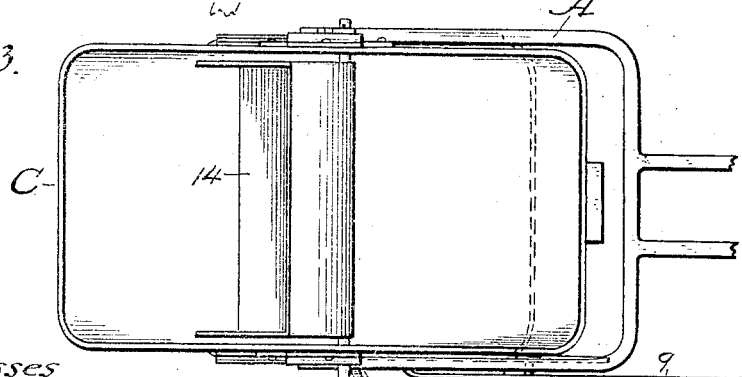

PETRONELLA EDTBAUER, OF CHICAGO, ILLINOIS.

WEIGHING-MACHINE.

1,306,052.

Specification of Letters Patent.    Patented June 10, 1919.

Application filed April 12, 1917.  Serial No. 161,439.

*To all whom it may concern:*

Be it known that I, PETRONELLA EDTBAUER, a citizen of the United States, residing at Chicago, in the county of Cook and State of Illinois, have invented new and useful Improvements in Weighing - Machines, of which the following is a full, clear and exact description.

My invention relates to weighing machines, and particularly to improvements in the weighing machines for which I obtained Letters Patent of the United States, December 14, 1909, No. 943,012, and for improvements in which I filed an application for Letters Patent of the United States, November 25, 1915, Serial No. 64,009.

The object of my invention is to provide simple means which are carried by the weighing bin and intercept and retain the excess quantity of products over and above a given predetermined measure being poured into the same in a continuous stream, while the bin is discharging its weighed contents, and which automatically discharge into the bin the excess so collected by it the moment said bin automatically closes, thus enabling said bin to continuously weigh and discharge its contents without loss of time. This I accomplish by the means hereinafter fully described, and as particularly pointed out in the claims.

In the drawings:

Figure 1 is a side elevation of a complete weighing machine showing my improvements applied thereto.

Fig. 2 is a side elevation of the upper broken away portion of said machine looking at it from the side opposite to that shown in Fig. 1, and drawn to an enlarged scale.

Fig. 3 is a plan view of the same.

The machine to which my improvements are applied has, like the machine illustrated and described in the aforesaid application, Serial No. 64,009, and disclosed in said Letters Patent, No. 943,012, a suitable supporting-frame or standard A arising from a suitable base; a balance-beam scale B that is fulcrumed in suitable bearings *b* projecting from said standard, and has a bin C suitably suspended between the bifurcated ends of one of the arms of said balance beam, which is adapted to receive the discharge from a superposed hopper D, as will hereinafter be more fully explained.

I do not claim anything new in the construction of the supporting-frame or standard, or in the construction of the balance-beam, nor in the construction of the hopper or the manner in which it is held in its superposed position by means of a bracket D', nor is there anything new in the construction or use of the receptacle or funnel E which directs the discharge from the bin into the bag held under the discharge end of the same. The novelty of my invention resides in the bin C itself when combined with the devices that intercept the continuous flow of the product being weighed during the discharge of the bin, and that are, preferably, actuated by the hinged bottom-plate 2 of the bin after the said bin is moved downward by the weight of its contents.

The bin is, preferably, rectangular in cross-section and is made slightly tapered in form from its top to its lower open end from which the products are discharged. This discharge opening is closed by bottom-plate 2, hereinbefore referred to, which is of slightly greater rectangular dimensions than the edges of said discharge opening and has its longitudinal sides turned upward and is pivoted by means of a transverse rock-shaft 4 in the lower ends of downwardly inclined rigid arms 3, 3, whose opposite ends are secured in any suitable manner to the sides of the lower portion of the bin. The axis of this rock-shaft is below and slightly to the rear of the lower end of the bin and the bottom-plate is counter-balanced by means of a weighted arm 5 secured and projecting from said rock-shaft in a direction opposite to that of the plate. One end of said bottom-plate 2, adjacent shaft 4, has an arm 6 projecting upwardly therefrom in an inclined direction toward the standard, and it has, near its upper end, a finger 7 projecting laterally therefrom which, when the discharge opening of the bin is closed, engages a shoulder 8 projecting down from the lower edge of a horizontally disposed trip lever 9, one end of which is pivotally connected to the side of the bin. This lever is normally supported by means of a pin 18 projecting laterally from a metal strip 19 secured to the side of and extending to the rear of the bin, which pin passes through a vertically elongated notch 20 in said lever. When the bin is at the limit of its upper movement pin 18 will engage the upper end of notch 20 and support the lever. When the products discharged into the bin have accumulated in sufficient quantity to raise the weight for which the scale has been adjusted, the bin moves downward a sufficient distance, and the rear end of trip lever 9 engages a ridge G secured to and arising from the upper end of the lower thicker portion of the standard and holds said lever stationary while finger 7 will move below and escape shoulder 8, whereupon bottom-plate 2 will move into the position shown in dotted lines in Fig. 2 and dump the contents of the bin, and arm 6 will move into the position shown in dotted lines in said figure. The upper end of arm 6 is also provided with a laterally projecting pin 10, and this pin extends through and engages a longitudinally elongated slot 15 in the lower portion of an arm 12, which latter projects downward toward the rear of the bin from the adjacent end of a rock-shaft 13, which latter extends through its bearings in the adjacent longitudinal side of the bin. This rock-shaft extends from side to side of the bin below the upper edges thereof, and between these bearings it has an intercepting scoop 14 secured thereto in such position that when said bottom-plate 2 of the bin is open, the segmentally curved bottom of said scoop will be horizontally disposed, as shown in dotted lines in Fig. 2, and when said bottom-plate is closed said scoop will be in the position shown in Fig. 2 of the drawings and discharges its contents into the bin.

The length of this intercepting scoop is less than the distance between the front and rear sides of the bin, and it is of a width extending from one longitudinal side of the said bin to the other, and its bottom is secured to the rock-shaft midway the length thereof. When the bottom-plate of the bin moves downward to discharge the contents thereof, an arm 6 causes arm 12 to move into the position shown in dotted lines in Fig. 2, the latter arm rocks shaft 13 and causes the scoop to move into the horizontal position shown in dotted lines in said figure and intercepts the continuous stream of products flowing into the bin from the hopper, and when the bin has discharged its weighed contents, weighted arm 5 will automatically close bottom-plate 2 and restore the intercepting scoop into its dumping position in which it does not intercept nor prevent the products from flowing into the bin.

In operation, the product discharged from the hopper flows in a continuous stream toward and into the top of the bin, and when the latter accumulates the desired measure of said product it immediately discharges, and at the same moment the scoop intercepts and stops the product falling from the hopper and holds the same during the time the bin is discharging the last weighed quantity of said product, and this intercepting and discharging of the product into the bin, alternates with the periods during which the bottom-plate opens and closes the discharge opening of the bin.

What I claim as new is:—

1. A weighing machine comprising a vertically movable bin in which a predetermined weight of products is adapted to be weighed, a plate which opens the discharge opening in said bin when said weight has accumulated therein, and a receptacle supported in the mouth of said bin which intercepts and collects the products poured into the same while it is discharging and which dumps the products so collected when the discharge opening of the bin is closed.

2. A weighing machine comprising a vertically movable bin in which a predetermined weight of products is adapted to be weighed, a plate which opens the discharge opening in said bin when said weight has accumulated therein, a receptacle supported in the mouth of said bin which intercepts and collects the products poured into the same while it is discharging and which dumps the products so collected when the discharge opening of the bin is closed, and means connecting said plate and receptacle.

3. A weighing machine comprising a vertically movable bin in which a predetermined weight of products is adapted to be weighed, a hinged plate which opens the discharge opening in said bin when said weight has accumulated therein, and a receptacle supported in the mouth of said bin which intercepts and collects the products poured into the same while it is discharging and which dumps the products so collected when the discharge opening of the bin is closed.

4. A weighing machine comprising a bin in which a predetermined weight of products is adapted to be weighed, a plate which opens the discharge opening in said bin when said weight has accumulated therein, and a tiltable receptacle supported in the mouth of said bin which intercepts and collects the products poured into the same while it is discharging and which dumps the products so collected when the discharge opening of the bin is closed.

5. A weighing machine comprising a bin in which a predetermined weight of products is adapted to be weighed, a hinged plate which opens the discharge opening in said bin when said weight has accumulated therein, and a tiltable receptacle supported in the mouth of said bin which intercepts and collects the products poured into the same while it is discharging and which dumps the products so collected when the discharge opening of the bin is closed.

6. A weighing machine comprising a bin in which a predetermined weight of products is adapted to be weighed, a plate which opens the discharge opening in said bin when said weight has accumulated therein, a receptacle supported in the mouth of said bin which intercepts and collects the products poured into the same while it is discharging and which dumps the products so collected when the discharge opening of the bin is closed, and means carried by said bin that connect said plate and receptacle.

7. A weighing machine comprising a bin in which a predetermined weight of products is adapted to be weighed, a hinged plate which opens the discharge opening in said bin when said weight has accumulated therein, a tiltable receptacle supported in the mouth of said bin which intercepts and collects the products poured into the same while it is discharging and which dumps the products so collected when the discharge opening of the bin is closed, and means carried by said bin that connect said plate and receptacle.

8. A weighing machine comprising a suitable scale having a balance-beam, a bin which is adapted to discharge from its lower open end and is supported by one end of and is movable with said beam, a bottom-plate which opens said lower end when the bin moves downward and closes it when the bin moves upward, and a movable scoop supported in the upper end of said bin which intercepts and holds the products discharging into said bin when said bottom-plate dumps the contents therefrom and which discharges its contents into the bin when said bottom plate closes the same.

9. A weighing machine comprising a suitable scale having a balance-beam, a bin which is adapted to discharge from its open lower end and is supported by one end of and is movable with said beam, a bottom-plate which opens said lower end when the bin moves downward and closes said lower end when the bin moves upward, and a rocking scoop supported in the upper end of said bin which intercepts and holds the products discharging into said bin when said bottom-plate dumps the contents therefrom and which discharges its contents into the bin when said bottom-plate closes the same.

10. A weighing machine comprising a suitable scale having a balance-beam, a bin which is adapted to discharge from its open lower end and is supported by one end of and is movable with said beam, a hinged bottom-plate which opens said lower end when the bin moves downward and closes said lower end when the bin moves upward, and a rocking scoop supported in the upper end of said bin which intercepts and holds the products discharging into said bin when said bottom-plate dumps the contents therefrom and which discharges into the bin when said bottom-plate closes the same, and means that transmit the motion of the axial element of said hinged bottom-plate to the axial element of said scoop.

11. A weighing machine comprising a suitable scale having a balance-beam, a bin supported by one end of and movable with said beam, a bottom-plate adapted to open and close the discharge opening in the lower end of said bin, a rock-shaft therefor, an arm projecting upward from said rock-shaft, a scoop positioned in the mouth of said bin, a rock-shaft upon which said scoop is mounted, and an arm projecting downward outside of said bin from said last mentioned rock-shaft to which motion is imparted by the arm projecting up from the rock-shaft of the bottom-plate.

12. A weighing machine comprising a suitable scale having a balance-beam, a bin supported by one end of and movable with said beam which is adapted to discharge from its open lower end, a counter-balanced hinged bottom-plate which opens said lower end when the bin moves downward and closes it when the bin moves upward, and a rocking-scoop supported in the upper end of said bin which intercepts and holds the products discharging into said bin when said bottom-plate dumps the contents therefrom and which discharges the contents into the bin when said bottom-plate closes the same.

13. In a weighing machine, a balance-beam, a bin that is suspended from one end and moves with said balance-beam and has a discharge opening in its bottom, a bottom-plate for opening and closing said discharge opening, a rock-shaft from which it projects, an arm projecting upward therefrom having a finger projecting laterally from its upper end, a trip lever having one end pivoted to said bin and the other resting on a fixed support and having a shoulder engaged by said bin, a scoop located in the mouth of said bin, a rock-shaft journaled in the sides of said bin, an arm projecting downward from an extended end of said last mentioned rock-shaft which is engaged by said first mentioned arm and moved thereby.

14. In a weighing machine, a balance-beam, a vertically movable bin suspended from one end and movable with said balance-beam and has a discharge opening in its lower end, a normally closed bottom-plate for opening and closing said discharge-opening, a rocking scoop located in the mouth of and is movable vertically with said bin, means for releasing said bottom-plate when a predetermined weight is in said bin, and devices for communicating the motion of said bottom-plate to said scoop.

In witness whereof I have hereunto set my hand this 3d day of April, 1917.

PETRONELLA EDTBAUER.

Witnesses:
FRANK D. THOMASON,
FLORENCE MITCHELL.

Copies of this patent may be obtained for five cents each, by addressing the "Commissioner of Patents, Washington, D. C."